(No Model.)
J. DICKSON.
NUT LOCK.
No. 421,910. Patented Feb. 25, 1890.
Fig. 1.
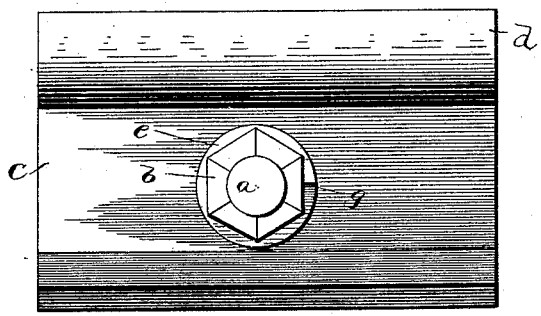
Fig. 2.
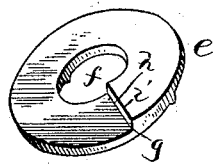
Fig. 5.
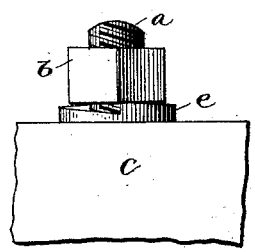
Fig. 3.
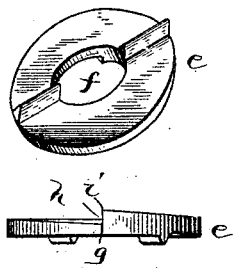
Fig. 4
Witnesses
E. C. Duffy
H. E. Peck
Inventor
Jonathan Dickson
By his Attorney O. E. Duffy

UNITED STATES PATENT OFFICE.

JONATHAN DICKSON, OF AGOSTA, OHIO.

NUT-LOCK.

SPECIFICATION forming part of Letters Patent No. 421,910, dated February 25, 1890.

Application filed November 15, 1889. Serial No. 330,413. (No model.)

*To all whom it may concern:*

Be it known that I, JONATHAN DICKSON, of Agosta, in the county of Marion and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to certain improvements in nut-locks.

The object of the invention is to provide an improved, cheap, simple, and durable locking-washer formed integral and which can be used on any ordinary bolt and nut without requiring special construction of either nut or bolt. These objects are accomplished by and my invention consists in certain novel features of construction and combinations of parts, more fully described hereinafter, and particularly pointed out in the claim.

Referring to the accompanying drawings, Figure 1 is an elevation of a section of rail and angle bar, showing the washer locking a nut in position thereon. Fig. 2 is a perspective of the washer. Fig. 3 is a perspective of the washer, looking at the under side of the same. Fig. 4 is a detail edge view of the washer. Fig. 5 is a similar view of the nut and washer.

In the drawings, the reference-letters *a* and *b* indicate, respectively, any usual bolt and a nut therefor, in the present instance shown clamping the bar *c* to the rail *d*.

The nut is locked against loosening by means of the locking-washer *e*, provided with a central opening *f* to receive the bolt. This washer is formed of hard spring-steel, and its outer face is formed of a gradual upward continuous incline around the bolt-hole from and to the point *g*, whereby one side of the outer face of the washer is raised above the other side, and the abrupt shoulder *h* is formed having the sharp biting-edge *i*, the essential feature being that the highest point of the face of the washer is the summit or biting-edge *i* of the shoulder *h*, which, when the nut is screwed up tightly against the washer, bites into the smooth under face of the washer and prevents loosening rotation of the nut. These washers can be formed square, so that one edge may rest against the angle-bar, and thereby hold the washer against turning; or the washer can be provided with the lugs *j* upon its under side to fit in corresponding recesses in the face of the body against which it lies to prevent the washer turning.

Any ordinary smooth-faced nut can be used, and when screwed up tightly against the washer the shoulder or edge of the washer embeds itself in the nut and prevents it from loosening, as the increasing incline is in the direction of tightening rotation of the nut, and consequently the shoulder and biting-edge face in the direction of loosening rotation; and, further, the unequal pressure on the under face of the nut, caused by said incline, forces the nut against one side of the bolt, and thereby assists in locking the nut. The washer can be made for either right or left hand nuts and can be used wherever bolts and nuts are employed.

Having thus fully described my invention, what I claim, and desire to secure by Letters Patent, is—

The combination of a bolt, a smooth-faced nut thereon, and the integral hard metal nut-locking washer formed to lock itself against rotation and having its entire face adjacent to the nut, composing a single continuous gradually-increasing incline around the bolt-hole, forming an abrupt shoulder and sharp biting-edge at the beginning and end of the incline facing opposite to the direction of loosening rotation of the nut, and making one side of said face higher than the other, whereby said edge bites into the under smooth face of the nut and holds the same, and the nut is tilted, as fully set forth.

In testimony that I claim the foregoing as my own I affix my signature in presence of two witnesses.

JONATHAN DICKSON.

Witnesses:
C. H. IREY,
E. F. GRIM.